United States Patent [19]
Mochida et al.

[11] Patent Number: 5,349,619
[45] Date of Patent: Sep. 20, 1994

[54] FUEL ASSEMBLY FOR LIGHT WATER REACTOR AND LIGHT WATER REACTOR CORE

[75] Inventors: Takaaki Mochida, Hitachi; Motoo Aoyama, Mito, both of Japan

[73] Assignee: Hitachi, Ltd., Tokyo, Japan

[21] Appl. No.: 64,638

[22] Filed: May 21, 1993

[30] Foreign Application Priority Data

May 21, 1992 [JP] Japan ................. 4-129027

[51] Int. Cl.$^5$ ............................................. G21C 3/32
[52] U.S. Cl. ........................................ 376/444; 376/447; 376/435
[58] Field of Search .................. 376/444, 447, 435

[56] References Cited

U.S. PATENT DOCUMENTS

| | | | |
|---|---|---|---|
| 4,708,845 | 11/1987 | Mildrum et al. | 376/435 |
| 4,926,450 | 5/1990 | Masuhara et al. | 376/444 |
| 4,986,958 | 1/1991 | Haikawa | 376/419 |
| 5,017,332 | 5/1991 | Dix et al. | 376/370 |
| 5,089,210 | 2/1992 | Reese et al. | 376/212 |

Primary Examiner—Donald P. Walsh
Assistant Examiner—Frederick H. Voss
Attorney, Agent, or Firm—Antonelli, Terry, Stout & Kraus

[57] ABSTRACT

A fuel assembly for a light water reactor comprising a plurality of fuel rods which contain plutonium as a primary fissile material when exposure is zero, and a light water reactor including such fuel assemblies. The fuel assembly has a structure in which at least one of moderator rods is provided at least in one of each corner portion of an arrangement of the fuel rods and a position adjacent to the corner portion in such a manner that the moderator rods are located in rotation symmetry, each of the moderator rods being filled with water or a solid coolant over a length at least corresponding to a fuel effective length, and the fuel rods are provided at positions in the second layer from the outermost periphery which are adjacent to those positions at which the moderator rods are located.

28 Claims, 15 Drawing Sheets

FUEL ASSEMBLY FOR LIGHT WATER REACTOR AND LIGHT WATER REACTOR CORE

BACKGROUND OF THE INVENTION

1. Industrial Field of the Invention

The present invention relates to a fuel assembly which constitutes a core of a nuclear reactor and, more particularly, to a fuel assembly for a light water reactor whose fuel is plutonium-uranium mixed oxide, and a core of a light water reactor utilizing the same.

2. Description of the Related Art

One conventional example of a fuel assembly used for a core of a nuclear reactor is an 8×8 type fuel assembly for a boiling water reactor (BWR). This fuel assembly is composed of a bundle of rods comprising a large number of elongated cylindrical fuel rods and water rods. The fuel rod is constituted of a fuel cladding which is filled with a large number of cylindrical UO2 fuel pellets and sealed both at upper and lower ends. The water rod has a cooling water inlet formed in a lower portion thereof and a cooling water outlet formed in an upper portion thereof so that cooling water flows inside of the water rod from the lower portion to the upper portion.

FIG. 21 is a horizontal cross-sectional view showing one example of an 8×8 type uranium fuel assembly according to the conventional technique.

As shown in FIG. 21, the fuel assembly 190 comprises fuel rods 192 of uranium oxide which are arranged in 8×8 lattice form, two water rods 196 which are located in a central portion thereof, and a channel box 197 which surrounds the fuel rods 192 and the water rods 196. When the fuel assembly 190 is mounted in a reactor core, a position adjacent to one corner portion of the fuel assembly 190 is used as a space in which a cruciform control rod 191 is inserted.

FIG. 22 shows another example of an 8×8 type uranium fuel assembly according to the conventional technique. In this fuel assembly 200, one water rod 206 is provided in the center of an 8×8 arrangement of fuel rods. The water rod 206, which is a large water rod, is located in an area from which four fuel rods 192 are removed. Except for this water rod, the fuel assembly 200 has substantially the same structure as the above-described fuel assembly 190.

In these two conventional examples, it is necessary to suppress the power peaking of the fuel assembly to a predetermined value or less and to prevent power of the fuel assembly per unit length, i.e., a linear heat generation ratio, from exceeding a limit value, in order not to deteriorate the fuel integrity.

On the other hand, from the standpoint of effective utilization of uranium resources, there has recently been carried forward a plutonium utilization in LWR program in which plutonium in used uranium fuel taken out of a light water reactor is recycled to the light water reactor. In this program, part or most of uranium fuel rods in a uranium fuel assembly are substituted by fuel rods of mixed oxide (MOX) in which plutonium is enriched, and MOX fuel assemblies thus obtained are mounted, as replacement fuel, on a light water reactor with uranium fuel assemblies. In this case, properties of the MOX fuel assembly should preferably be similar to those of the uranium fuel assembly. Also, the design of uranium fuel has a high-burnup tendency, and accordingly, the design of MOX fuel should preferably have a high-enrichment tendency, i.e., a plutonium load per fuel assembly should preferably be made as large as possible. However, when a load ratio of plutonium of the MOX fuel assembly is increased, there is caused a difference between reactor core properties of the MOX fuel assembly and those of a uranium fuel assembly owing to a difference between nuclear properties of uranium and those of plutonium. That is to say, because plutonium 239 Pu, 241 Pu which is fissile material has a thermal neutron absorption cross section larger than uranium 235 U, and because a neutron resonance effect by plutonium 240 Pu is larger than uranium 235 U, a neutron flux spectrum of MOX fuel is harder than a neutron flux spectrum of uranium fuel, thereby deteriorating neutron moderation. As a result, there are caused a decrease in thermal margin in a transient event due to an increase in an absolute value of void reactivity coefficient, an increase in distortion of the axial power distribution, a decrease in a moderator reactivity coefficient, or a decrease in reactor shutdown margin due to a decrease in a control rod worth.

Deteriorations of these properties are in allowable ranges if a fissile plutonium load is about ⅓ or less of the whole fissile material, and consequently, the structural design of the uranium fuel assembly can be used as it is. However, if the fissile plutonium load is higher, a water to fuel ratio of the fuel lattice must be increased to improve the neutron moderation.

The following two examples are known as means for improving the neutron moderation of the MOX fuel assembly:

(1) Fuel Assembly for Nuclear Reactor (Japanese Patent Unexamined Publication No. 63-172990)

In this conventional technique, four fuel rods in the vicinity of one large water rod provided in the center of an MOX fuel assembly are substituted by four water rods having the same diameter as the fuel rods, so that the absolute value of the void reactivity coefficient of the MOX fuel assembly will be decreased.

(2) Boiling Water Reactor (Japanese Patent Unexamined Publication No. 63-293493)

In this conventional technique, the water to fuel ratio of an MOX fuel assembly is made larger than that of a uranium fuel assembly by increasing the diameter of a water rod located in the center. Thus, various properties of the MOX fuel assembly, such as a void coefficient, an axial power distribution and a reactor shutdown margin, are made substantially equal to those of the uranium fuel assembly.

On the other hand, the following five examples are known in relation to the arrangement of water rods in a uranium fuel assembly:

(3) Fuel Assembly (Japanese Patent Unexamined Publication No. 60-105990)

In this conventional technique, one to three water rods are provided in corner portions of a channel box on the side of a local power range monitor, i.e., on the other side of a control rod, so that errors in the output of the local power range monitor are decreased to thereby improve the load factor and the fuel integrity.

(4) Fuel Assembly and Core of Nuclear Reactor (Japanese Patent Unexamined Publication No. 57-23891)

In this conventional technique, one to five water rods are provided in corner portions of a channel box on the side of a control rod, so that the thermal duty of fuel rods adjacent to the control rod is decreased so as to prevent generation of cracks.

(5) Fuel Assembly (Japanese Patent Unexamined Publication No. 57-583)

In this conventional technique, water rods are provided in corner portions of a channel box on the side of a control rod, to thereby prevent a decrease in the thermal margin owing to the control rod history effect.

(6) Fuel Assembly (Japanese Patent Unexamined Publication No. 60-201284)

In this conventional technique, one part of an upper portion of a fuel rod is formed into a water rod, and such fuel rods are provided in corner portions of a channel box, so as to improve the reactor shutdown margin and flatten the axial power distribution.

(7) Nuclear Reactor (Japanese Patent Unexamined Publication No. 60-222791)

In this conventional technique, the nuclear reactor comprises fuel assemblies in which the number of water rods provided in each fuel assembly is increased from the center of a reactor core toward the periphery, and there are located in the outermost periphery of the reactor core fuel assemblies in which water rods are provided on the diagonal lines including corner portions of a channel box, to thereby uniform the exposure distribution in the nuclear reactor and to save uranium.

The above-described conventional example (1) involves the following problems. That is to say, since the number of water rods is increased and the number of fuel rods is decreased, the average linear heat generation ratio is increased. Therefore, the local power peaking must be further lowered to observe the limit value of the maximum linear heat generation ratio. Consequently, the design of a fuel enrichment distribution becomes more complicated. Further, an increase in the number of water rods and a decrease in the number of MOX fuel rods result in a decrease in the plutonium load per fuel assembly.

In the conventional example (2), the void reactivity coefficient of the mixed type fuel assembly is improved. However, the value is still about $-9.5$ [%K/K/%void]. When it is compared with the value of the uranium fuel assembly which is about $-8.3$ [%K/K/%void], it can be understood that the improvement effect is insufficient.

Moreover, when the known techniques in relation to the arrangement of water rods described in the conventional examples (3) to (7) are applied to the means for improving the neutron moderation, the following problems are induced:

In application of the conventional examples (3) to (5), locations of the water rods are asymmetric so that the power peaking will be increased.

In application of the conventional example (6), only the part of the upper portion of each fuel rod is formed into a water rod, and consequently, the neutron moderation is not adequately improved.

In application of the conventional example (7), the fuel assemblies are special ones which are located in the outermost peripheral range of the reactor core and can not be provided for general use. Further, the disclosed technique is concerned with uranium fuel alone, and MOX fuel is not mentioned.

In other words, when this conventional example (7) having more water rods and less fuel rods is compared with a fuel assembly which produces the same power, the fuel rod average heat generation ratio, i.e., the heat generation ratio per unit length of a fuel rod, is larger. In order to avoid this situation, it is suggested to increase the number of water rods in assemblies in the outer peripheral portion of the reactor core which produce low power. Because they are the assemblies which can only be used in the outer peripheral portion of the reactor core, they can not be provided for general use.

Furthermore, when a water rod is provided in the second layer from the outermost periphery and located adjacent to a water rod in each corner portion of the fuel assembly, the local power of fuel rods in the outer peripheral portion which are in contact with these two water rods is increased, and it is not favorable from the standpoint of limitation of the linear heat generation ratio. Therefore, location of such fuel assemblies is limited to the outer peripheral portion of the reactor core.

The above-described seven problems are concerned with the BWR. On the other hand, in a pressurized water reactor (PWR), the core is not boiling during normal operation so that the void reactivity coefficient as in the case of the BWR is not a problem. However, there is a moderator temperature coefficient serving as an index for-indicating a reactivity change with respect to a water density change. When MOX fuel is used, this moderator temperature coefficient is deteriorated, similarly to the void reactivity coefficient in the case of the BWR. In order to improve this moderator temperature coefficient, it is effective to provide water rods without decreasing the number of MOX fuel rods largely, similarly to the improvement of the void reactivity coefficient in the case of the BWR.

SUMMARY OF TEE INVENTION

It is an object of the present invention to provide fuel assemblies for the light water reactor and a core of a light water reactor utilizing the same, in which even if MOX fuel assemblies are used in place of uranium fuel assemblies, the void reactivity coefficient or the moderator temperature coefficient can be made substantially equal to that of the uranium fuel assemblies without decreasing the plutonium load largely and without increasing the linear heat generation ratio largely.

In order to achieve the above object, this invention provides a fuel assembly for a light water reactor comprising a plurality of fuel rods which contain plutonium as a primary fissile material when exposure is zero, wherein at least one of water rods in which cooling water flows is provided at least in one of each corner portion of an arrangement of the fuel rods and a position adjacent to the corner portion in such a manner that the water rods are located in rotation symmetry, each of the water rods being filled with water over a length at least corresponding to a fuel effective length, and the fuel rods are provided at positions in the second layer from the outermost periphery which are adjacent to those positions at which the water rods are located.

In this fuel assembly for the light water reactor, one of the water rods may be located in one of each corner portion of the arrangement of fuel rods and the position adjacent to the corner portion in rotation symmetry, or two of the water rods may be provided in each corner portion of the arrangement of fuel rods and the position adjacent to the corner portion in such a manner that the water rods are located in rotation symmetry, or two of the water rods may be provided in both of the positions adjacent to each corner portion of the arrangement of fuel rods in such a manner that the water rods are located in rotation symmetry.

Also, the invention provides a fuel assembly for a light water reactor comprising a plurality of fuel rods which contain plutonium as a primary fissile material when exposure is zero, wherein at least one of solid moderator rods is provided in one of each corner portion of an arrangement of the fuel rods and a position adjacent to the corner portion in such a manner that the solid moderator rods are located in rotation symmetry, each of the solid moderator rods being filled with a solid moderator over a length at least corresponding to a fuel effective length, and the fuel rods are provided at positions in the second layer from the outermost periphery which are adjacent to those positions at which the solid moderator rods are located.

In this fuel assembly for the light water reactor, one of the solid moderator rods may be located in one of each corner portion of the arrangement of fuel rods and the position adjacent to the corner portion in rotation symmetry, or two of the solid moderator rods may be provided in each corner portion of the arrangement of fuel rods and in the position adjacent to the corner portion in such a manner that the solid moderator rods are located in rotation symmetry, or two of the solid moderator rods may be provided in both positions adjacent to each corner portion of the ar-rangement of the fuel rods in such a manner that the solid moderator rods are located in rotation symmetry.

Further, the invention provides a fuel assembly for a light water reactor comprising a plurality of fuel rods which contain plutonium as a primary fissile material when exposure is zero and a plurality of fuel rods which only contain uranium as a fissile material when exposure is zero, wherein at least one of water rods in which cooling water flows is provided at least in one of each corner portion of an arrangement of the fuel rods and a position adjacent to the corner portion in such a manner that the water rods are located in rotation symmetry, each of the water rods being filled with water over a length at least corresponding to a fuel effective length, and the fuel rods are provided at positions in the second layer from the outermost periphery which are adjacent to those positions at which the water rods are located.

In this fuel assembly for the light water reactor, one of the water rods may be located in one of each corner portion of the arrangement of fuel rods and the position adjacent to the corner portion in rotation symmetry, or two of the water rods may be provided in each corner portion of the arrangement of fuel rods and in the position adjacent to the corner portion in such a manner that the water rods are located in rotation symmetry, or two of the water rods may be provided in both positions adjacent to each corner portion of the arrangement of fuel rods in such a manner that the water rods are located in rotation symmetry.

Moreover, the invention provides a fuel assembly for a light water reactor comprising a plurality of fuel rods which contain plutonium as a primary fissile material when exposure is zero and a plurality of fuel rods which only contain uranium as a fissile material when exposure is zero, wherein at least one of solid moderator rods is provided at least in one of each corner portion of an arrangement of the fuel rods and a position adjacent to the corner portion in such a manner that the solid moderator rods are located in rotation symmetry, each of the solid moderator rods being filled with a solid moderator over a length at least corresponding to a fuel effective length, and the fuel rods are provided at positions in the second layer from the outermost periphery which are adjacent to those positions at which the solid moderator rods are located.

In this fuel assembly for the light water reactor, one of the solid moderator rods may be located in one of each corner portion of the arrangement of fuel rods and the position adjacent to the corner portion in rotation symmetry, or two of the solid moderator rods may be provided in each corner portion of the arrangement of fuel rods and in the position adjacent to the corner portion in such a manner that the solid moderator rods are located in rotation symmetry, or two of the solid moderator rods may be provided in both positions adjacent to each corner portion of the arrangement of the fuel rods in such a manner that the solid moderator rods are located in rotation symmetry.

Furthermore, the present invention provides a core of a light water reactor comprising first fuel assemblies each including a plurality of fuel rods which only contain uranium as a fissile material when exposure is zero, second fuel assemblies each including a plurality of fuel rods which contain plutonium as a primary fissile material when exposure is zero, in which second fuel assembly at least one of solid moderator rods is provided at least in one of each corner portion of an arrangement of the fuel rods and a position adjacent to the corner portion in such a manner that the moderator rods are located in rotation symmetry, each of the moderator rods being filled with a filling substance over a length at least corresponding to a fuel effective length, and the fuel rods are provided at positions in the second layer from the outermost periphery which are adjacent to those positions at which the moderator rods are located.

In this core of the light water reactor, the second fuel assemblies may have substantially the same shape and dimensions as the first fuel assemblies.

Also, in this core of the light water reactor, the second fuel assemblies may be each arranged in such a manner that one of the moderator rods is located in one of each corner portion of the arrangement of fuel rods and the position adjacent to the corner portion in rotation symmetry, or that two of the moderator rods are provided in each corner portion of the arrangement of the fuel rods and in the position adjacent to the corner portion in such a manner that the moderator rods are located in rotation symmetry, or that two of the moderator rods are provided in both positions adjacent to each corner portion of the arrangement of the fuel rods in such a manner that the moderator rods are located in rotation symmetry.

In the present invention of the above-described structure, at least one water rod is provided at least in one of each corner portion of the arrangement of the fuel rods and a position adjacent to the corner portion in such a manner that the water rods are located in rotation symmetry, and also, the fuel rods are provided at positions in the second layer from the outermost periphery which are adjacent to those positions at which the water rods are located. Consequently, the effect of improving the void reactivity coefficient per water rod is enhanced. As a result, in respect of the plutonium load and the linear heat generation ratio, there can be provided the MOX fuel assembly which can substitute the uranium fuel assembly.

Especially, one water rod is located in each corner portion of the arrangement of fuel rods or in a position in the lattice form which is adjacent to the corner portion, so that the number of additional water rods required for improving the void reactivity coefficient will be suppressed to the minimum. Therefore, the MOX fuel assembly which is substantially equivalent to the uranium fuel assembly can be provided favorably.

Further, in order to realize the improvement effect of the void reactivity coefficient, this water rod must have a length substantially equal to that of a region in which nuclear fuel is filled over substantially the entire length of the fuel rod (referred to as a fuel effective portion).

DETAILED DESCRIPTION OF THE PREFERRED EMBODIMENTS

The preferred embodiments of the present invention will be hereinafter described with reference to FIGS. 1 to 20.

First, the principle of this invention will be explained with reference to FIGS. 1 to 3.

Figure 1:
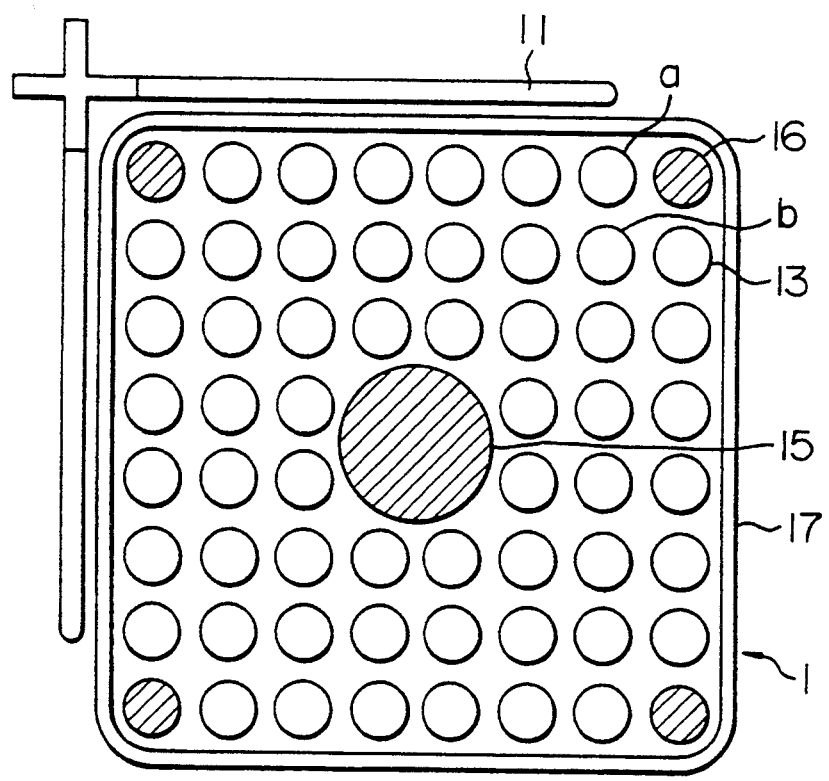
FIG. 1 is a cross-sectional view showing an 8×8 type MOX fuel assembly for a BWR according to a first embodiment of the present invention.

FIG. 1 illustrates one embodiment for explaining the principle of the invention. In FIG. 1, an MOX fuel assembly of this embodiment comprises fuel rods of plutonium-uranium mixed oxide, i.e., MOX fuel rods 13 which are arranged in 8×8 lattice form, a large water rod 15 which is located in the center, four water rods 16 each of which is provided in one of the corners of the 8×8 fuel rod arrangement, and a channel box 17 which surrounds the fuel rods 13, and the water rods 15, 16.

The water rods 15, 16 have a length equal to that of a fuel effective portion extending over substantially the entire length of the fuel rod 13. When the fuel assembly 1 is mounted on a reactor core, a position adjacent to one of the corner portions of the fuel assembly 1 is used as a space in which a cruciform control rod 11 is inserted.

Figure 2:
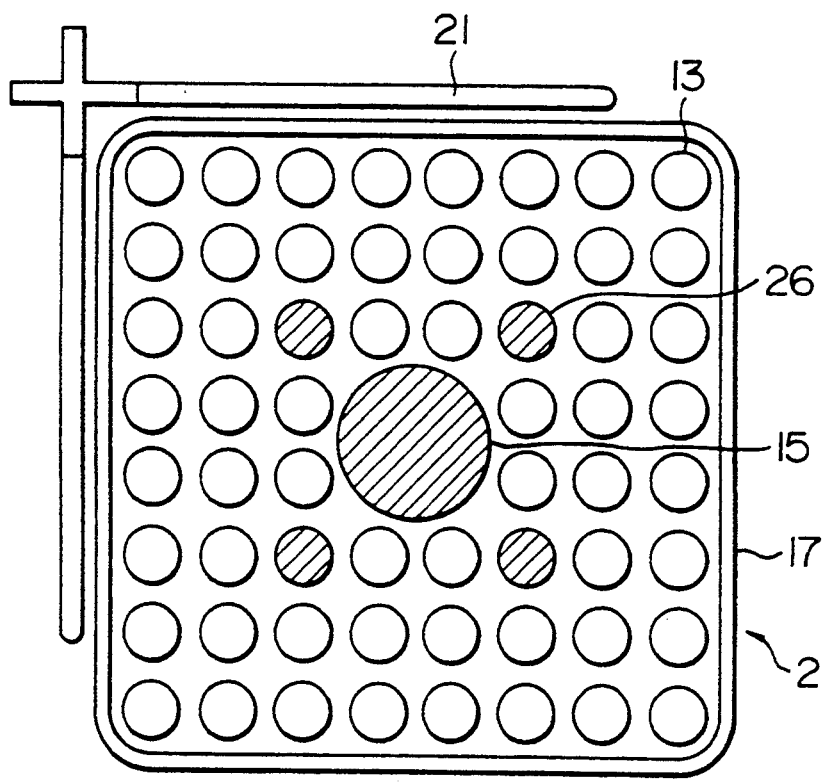
FIG. 2 is a cross-sectional view showing a conventional example of 8×8 type MOX fuel assembly.
Figure 22:
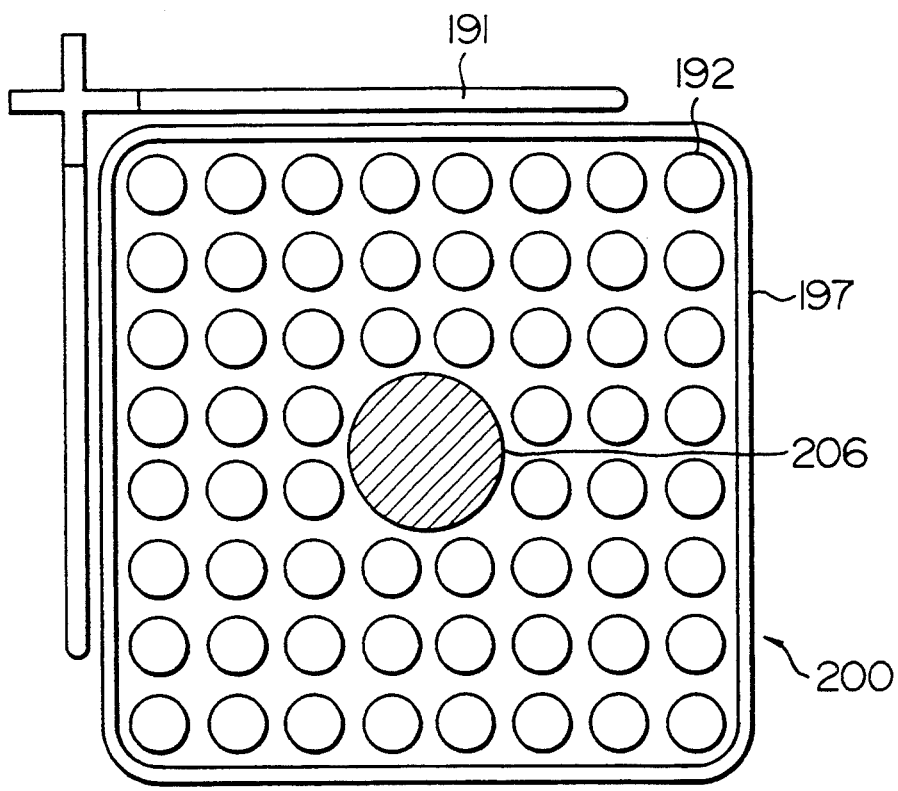
FIG. 22 is a cross-sectional view showing another conventional 8×8 type uranium fuel assembly.

For the purpose of comparison, FIG. 2 shows, in cross section, an 8×8 type MOS fuel assembly according to the above-described conventional technique disclosed in Japanese Patent Unexamined Publication No. 63-293493. In this fuel assembly 2, MOX fuel rods 13 are employed instead of the uranium fuel rods 192 of the uranium fuel assembly shown in FIG. 22, and four water rods 26 are used in place of four of the fuel rods 192 in the vicinity of the central large water rod 206. The fuel assembly 2 has substantially the same structure as the MOX fuel assembly 1 shown in FIG. 1 except for the arrangement of the four water rods 16 and 26.

Figure 3:
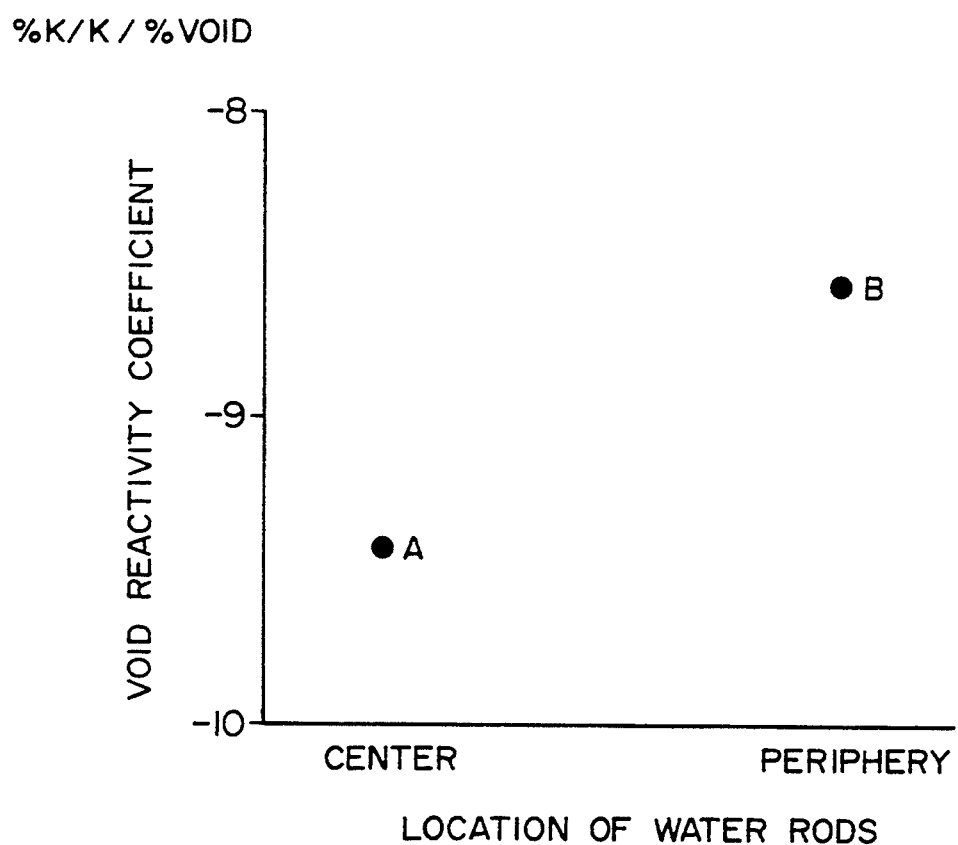
FIG. 3 is a chart for comparing a void reactivity coefficient of the 8×8 type MOX fuel assembly according to the invention shown in FIG. 1 with that of the conventional example of 8×8 type MOX fuel assembly shown in FIG. 2.

FIG. 3 illustrates comparison of void reactivity coefficients of these two MOX fuel assemblies 1 and 2. The point A indicates a void reactivity coefficient of the MOX fuel assembly 1 shown in FIG. 1, and the point B indicates a void reactivity coefficient of the MOX fuel assembly 2 shown in FIG. 2. As shown in FIG. 3, the void reactivity coefficients have different values depending upon the locations of the water rods even if the total numbers of the water rods are the same. When the water rod 16 is located in each of the corner portions as shown in FIG. 1, the absolute value becomes small and the improvement effect becomes large when compared with a case in which the water rods are located in the vicinity of the central portion, for the following reason: When the water rods are provided in the corner portions away from the center, the water rods are located in saturated water regions in the vicinity of corner portions of a water gap outside of the channel box. As a result, neutron absorption effect of the water rods is increased, and a change in neutron absorption of the fuel rods in accordance with a change in the void fraction becomes relatively small, i.e., a change in the reactivity coefficient is decreased.

Further, a neutron absorption cross section of plutonium which is fissile material is larger than that of uranium. Consequently, in the case of the MOX fuel assembly, when neutron absorption effect of the water rods is increased, neutron absorption effect of the fuel rods is decreased so that the effect of reducing the void reactivity change will be greater than that of the uranium fuel assembly.

In the design of the conventional uranium fuel assembly, flattening of the local power distribution in the fuel assembly has been regarded as an important factor. Therefore, the water rods are located in the center of the arrangement of the fuel rods so as to flatten the thermal neutron distribution, thereby flattening the power distribution. In the MOX fuel assembly, however, reduction of the void reactivity coefficient is a primary problem, and in order to solve this problem, an increase in the linear heat generation ratio due to an increase in the number of water rods must be made as small as possible. In consequence, the arrangement of water rods which enhances the effect of reducing the void reactivity coefficient should preferably be selected, and the number of the required water rods should preferably be made as small as possible.

In the present invention, since the four water rods 16 are respectively provided in the four corner portions of the arrangement of the fuel rods, the void reactivity coefficient per water rod is improved more effectively, as described above. As a result, the number of additional water rods required for improving the void reactivity coefficient is suppressed to the minimum, so that it is possible to provide a highly enriched MOX fuel assembly which is as excellent as the uranium fuel assembly in respect of the plutonium load and the linear heat generation ratio.

In the fuel assembly shown in FIG. 1, the water rods 16 are located in the corner portions of the fuel rod arrangement. However, even if the water rods 16 are located in positions in the lattice form which are adjacent to the corner portions, it is possible to enhance the effect of increasing neutron absorption by the saturated water regions in the vicinity of the corner portions of the water gap, and to increase the effect of improving the void reactivity coefficient per water rod. In this case, locating the four water rods in rotation-symmetry is an important factor in reduction of the maximum linear heat generation ratio. That is to say, if the water rods are located in non-rotation-symmetry, the power distribution viewed in horizontal cross section of the fuel assembly is in non-rotation-symmetry, which results in a general characteristic that the power peaking is increased. When the water rods are provided in rotation-symmetry, the power peaking can be decreased so as to suppress an increase in the average linear heat generation ratio owing to addition of the four water rods, thus reducing an increase in the maximum linear heat generation ratio.

Moreover, when the water rods are located in the corner portions, water rods must not be further provided at positions b shown in FIG. 1, which are adjacent to the water rods and in the second layer from the outer periphery. In other words, when two water rods are provided in each corner portion and a position in the second layer which are adjacent to each other, the MOX fuel rod (a fuel rod a shown in FIG. 1) in the outermost peripheral portion which is adjacent to the water rod in the corner portion has two surfaces in contact with the water rods and one surface in contact with the saturated water region outside of the channel box. Therefore, neutron moderation around this MOX fuel rod is increased. Particularly, the power change of MOX due to a change in neutron moderation is larger than that of uranium. For these reasons, the power peaking of the MOX fuel rod a becomes much higher than that of the other fuel rods. Consequently, such an arrangement is unfavorable from the standpoint of suppressing the increase in the linear heat generation ratio.

Furthermore, in order to realize the above-described improvement effect of the void reactivity coefficient, the water rods 16 must have a length equal to that of a fuel effective portion extending over substantially the entire length of the fuel rod 13.

Next, a first embodiment of the present invention based on the above-described principle will be described with reference to FIGS. 4 to 12. This embodiment is a 9×9 type MOX fuel assembly to which the invention is applied.

Figure 4:
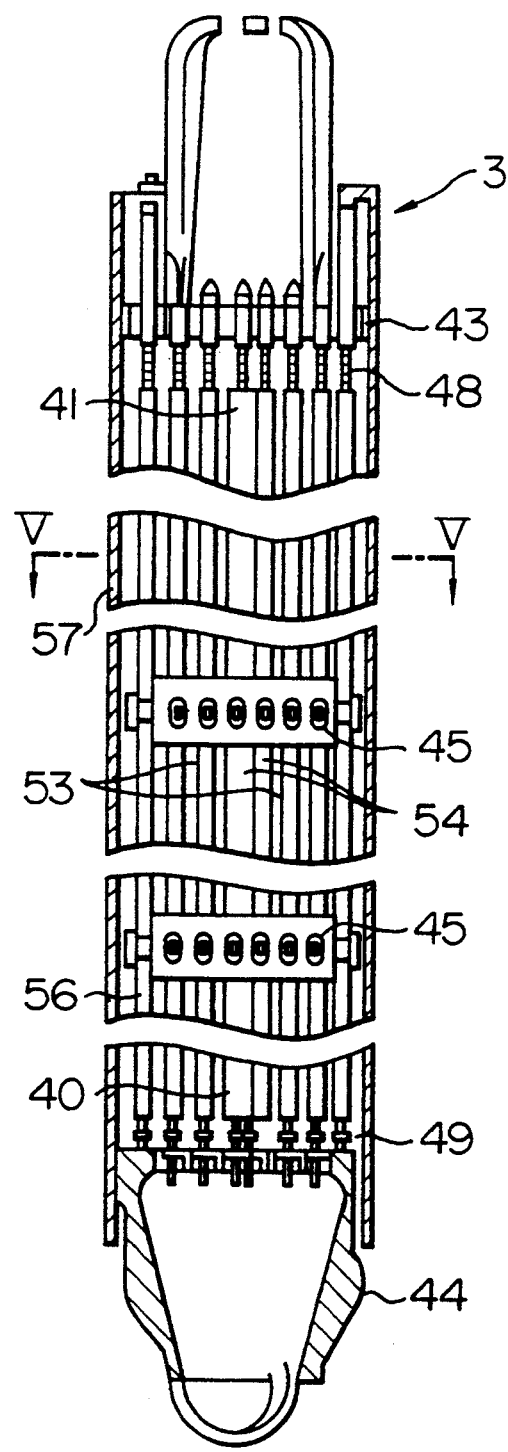
FIG. 4 is a diagram showing an entire structure of a 9×9 type MOX fuel assembly according to a second embodiment of the invention.

As shown in FIG. 4, a fuel assembly 3 according to this embodiment comprises a bundle of a large number of elongated cylindrical fuel rods 53. In this bundle, the fuel rods 53 are supported at equal intervals by spacers 45. In addition to the fuel rods 53, water rods 54, 56 are incorporated in the bundle. The outer periphery of this bundle is surrounded with a channel box 57. An upper portion of the channel box 57 is bonded to an upper tie plate 43 while a lower portion thereof is bonded to a lower tie plate 44.

Each of the fuel rods 53 is a fuel cladding filled with a large number of cylindrical fuel pellets of plutonium-uranium mixed oxide, and both upper and lower ends of this fuel cladding are sealed with an upper plug 48 and a lower plug 49. The upper plug 48 includes an extension portion which can be inserted in a support opening in the upper tie plate 43, and the lower plug 49 includes a fitting portion which can be closely fitted in a support opening in the lower tie plate 44.

A cooling water inlet hole 40 is formed in a lower portion of each of the water rods 54, 56, and a cooling water outlet hole 41 is formed in an upper portion thereof, so that cooling water flows inside of the water rod 54, 56 from the lower portion to the upper portion. The water rods 54, 56 have a length substantially equal to the entire length of the fuel rod 53.

Figure 5:
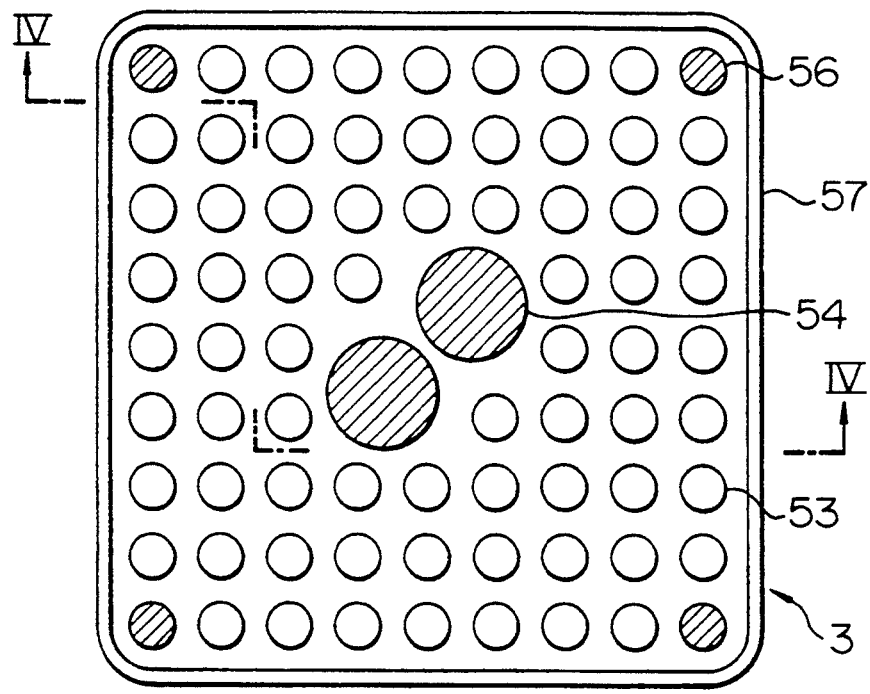
FIG. 5 is a cross-sectional view showing the second embodiment of FIG. 4.

FIG. 5 is a horizontal cross-sectional view of the fuel assembly 3. The fuel rods 53 are regularly arranged in a lattice form of nine rows and nine lines (9×9). Two water rods 54, which are large water rods, are provided in an area from which seven fuel rods are removed. A primary object of provision of these large water rods 54 is to increase neutron moderation effect in the central portion of the fuel assembly 3 and to flatten the local power distribution. Four water rods 56 have substantially the same diameter as the fuel rods 53, and are located in corner portions of the 9×9 lattice arrangement of the fuel rods.

Next, the function of this embodiment will be explained.

Figure 6:
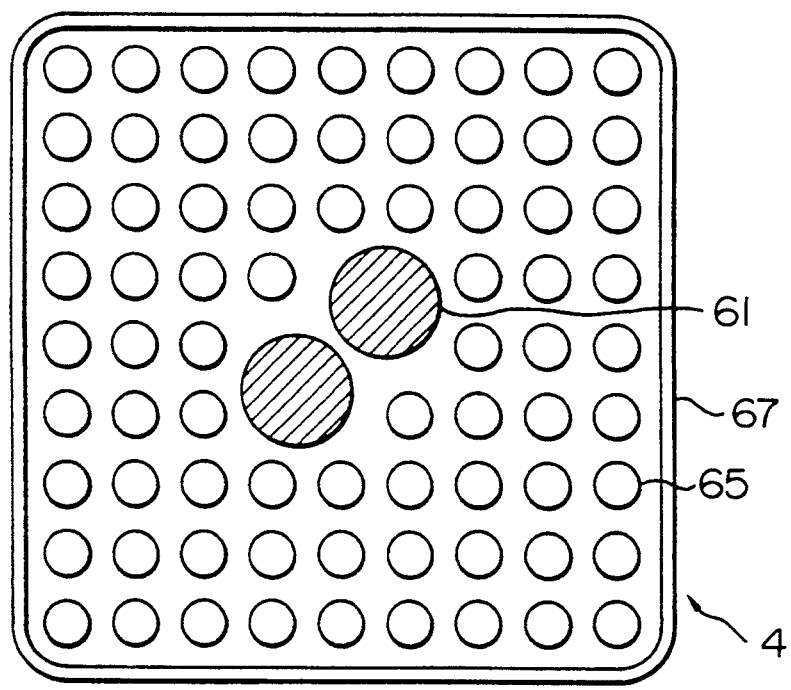
FIG. 6 is a cross-sectional view showing a conventional 9×9 type uranium fuel assembly which is a first comparative example of the second embodiment.

As a first comparative example of the first embodiment, FIG. 6 shows a 9×9 type uranium fuel assembly according to the conventional technique. This fuel assembly 4 comprises uranium fuel rods 65 which are arranged in a 9×9 lattice form, two large water rods 61 which are provided in the central portion, and a channel box 67 which surrounds the fuel rods 65 and the water rods 61.

As similarly to the above-mentioned large water rods 54, a main object of provision of the large water rods 61 is to uniform the local power distribution. The large water rods 61 are provided in an area of the 9×9 fuel rod arrangement from which seven central fuel rods are removed, and have a length equal to that of a fuel effective portion extending over substantially the entire length of the fuel rod 65.

This fuel assembly 4 is different from the MOX fuel assembly 3 shown in FIG. 5 with respect to an arrangement of uranium fuel rods and the provision of the uranium fuel rods 65 in the corner portions instead of the water rods.

Figure 7:
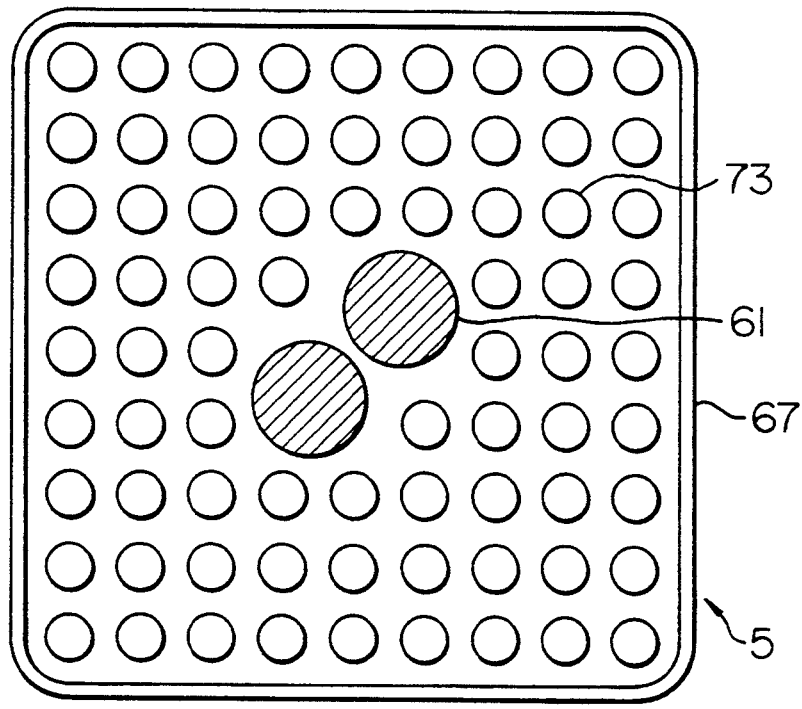
FIG. 7 is a cross-sectional view showing a 9×9 type MOX fuel assembly which is a second comparative example of the second embodiment.

Further, as a second comparative example, FIG. 7 shows a 9×9 type MOX fuel assembly. In this fuel assembly 5, MOX fuel rods 73 are employed instead of the uranium fuel rods 65 of the uranium fuel assembly 4 shown in FIG. 6. The fuel assembly 5 has substantially the same structure as the MOX fuel assembly 3 shown in FIG. 5 except for the MOX fuel rods 73 provided in the corner portions in place of the water rods.

Figure 8:
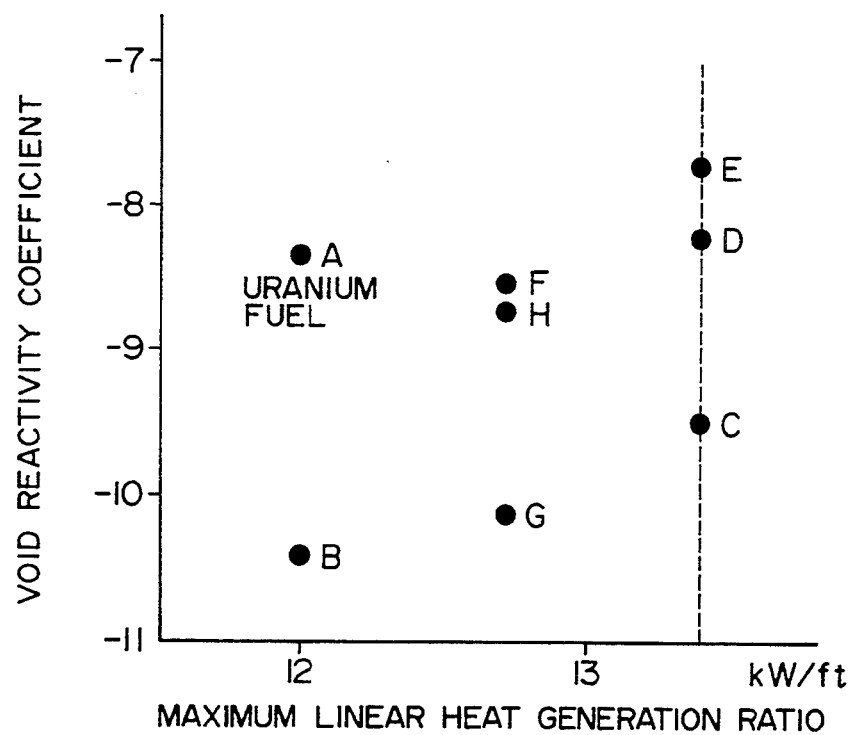
FIG. 8 is a chart for comparing void reactivity coefficients and maximum linear heat generation ratios of the MOX fuel assembly of the second embodiment shown in FIG. 4, the uranium fuel assembly of the first comparative example shown in FIG. 6 and the MOX fuel assembly of the second comparative example shown in FIG. 7.

FIG. 8 illustrates comparisons of void reactivity coefficients and maximum linear heat generation ratios of the MOX fuel assembly 3 shown in FIG. 5, the uranium fuel assembly 4 which is the first comparative example shown in FIG. 6 and the MOX fuel assembly 5 which is the second comparative example shown in FIG. 7. In FIG. 8, the point F indicates values of the MOX fuel assembly 3 of FIG. 5, the point A indicates values of the uranium fuel assembly 4 of FIG. 6, and the point B indicates values of the MOX fuel assembly 5 of FIG. 7. As shown in FIG. 8, a void reactivity coefficient of the MOX fuel assembly 3 according to the present invention which is indicated by the point F is about −8.5 [%K/K/%void] and substantially equal to a void reactivity coefficient of the uranium fuel assembly 4 indicated by the point A which is about −8.3 [%K/K/%void]. However, a void reactivity coefficient of the MOX fuel assembly 5 indicated by the point B is about −10.4 [%K/K/%void] and about 30% larger than the value indicated by the point F. On the other hand, a maximum linear heat generation ratio of the MOX fuel assembly 3 indicated by the point F is about 12.7 [kW/ft] and substantially equal to a maximum linear heat generation ratio of the uranium fuel assembly 4 indicated by the point A which is about 12.0 [kW/ft]. A maximum linear heat generation ratio of the MOX fuel assembly 5 indicated by the point B is equal to the maximum linear heat generation ratio of the uranium fuel assembly 4 which is about 12.0 [kW/ft].

According to the above-described comparison results, when the uranium fuel rods in the uranium fuel assembly are substituted by the MOX fuel rods, the maximum linear heat generation ratio is not changed because the water to fuel volume ratio is the same, but the absolute value of the void reactivity coefficient is about 30% larger. That is to say, in relation to the void reactivity coefficient alone, substitution of the uranium fuel by the MOX fuel is not favorable. In other words, in order to improve the void reactivity coefficient, the number of water rods must be increased, which results in an increase of the maximum linear heat generation ratio. However, in this embodiment in which the water rods are provided in the corner portions of the arrangement of the fuel rods according to the above-described principle, substantially the same void reactivity coefficient as in the case of the uranium fuel assembly can be obtained without increasing the linear heat generation ratio by a large extent.

The effect of this embodiment of improving the void reactivity coefficient and the maximum linear heat generation ratio will now be described more specifically.

Figure 9:
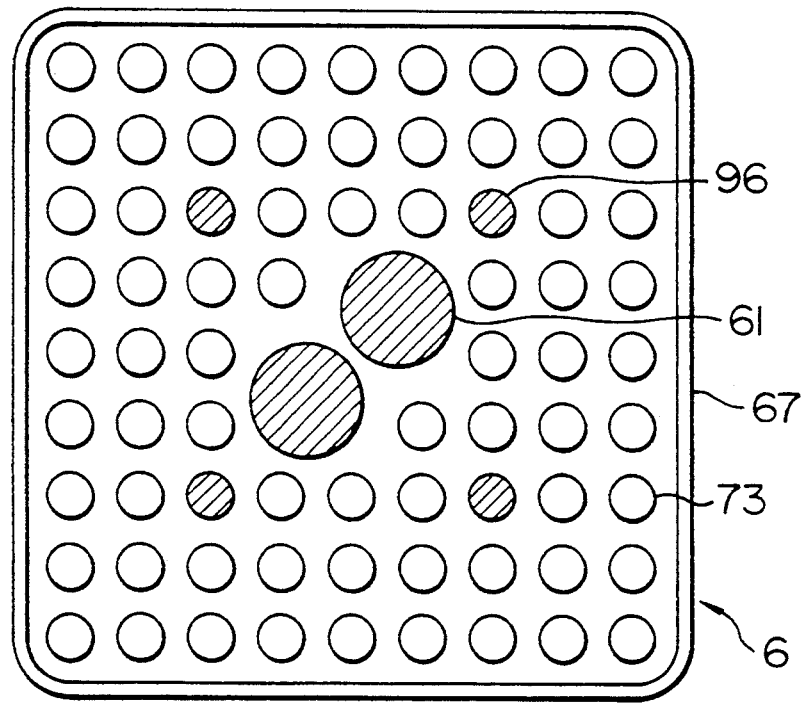
FIG. 9 is a cross-sectional view showing a 9×9 type MOX fuel assembly which is a third comparative example of the second embodiment shown in FIG. 4.

As a third comparative example, FIG. 9 shows another 9×9 type MOX fuel assembly. This fuel assembly 6 has substantially the same structure as the MOX fuel assembly 5 shown in FIG. 7 except for four water rods 96 which are provided in four corners of a square defined by four sides each having five fuel rods in the vicinity of the two large water rods 61 located in the central portion, so as to decrease the absolute value of the void reactivity coefficient. In FIG. 8, the point G indicates a void reactivity coefficient and a maximum linear heat generation ratio of the fuel assembly 6. As compared with the MOX fuel assembly 5 indicated by the point B, the void reactivity coefficient is slightly improved and is about −10.2 [%K/K/%void], but the absolute value is still 20% larger than the value of the uranium fuel assembly 4 indicated by the point A. Moreover, the number of the fuel rods is decreased, and the average linear heat generation ratio is increased. As a result, the maximum linear heat generation ratio is increased and is about 12.7 [kW/ft].

Figure 10:
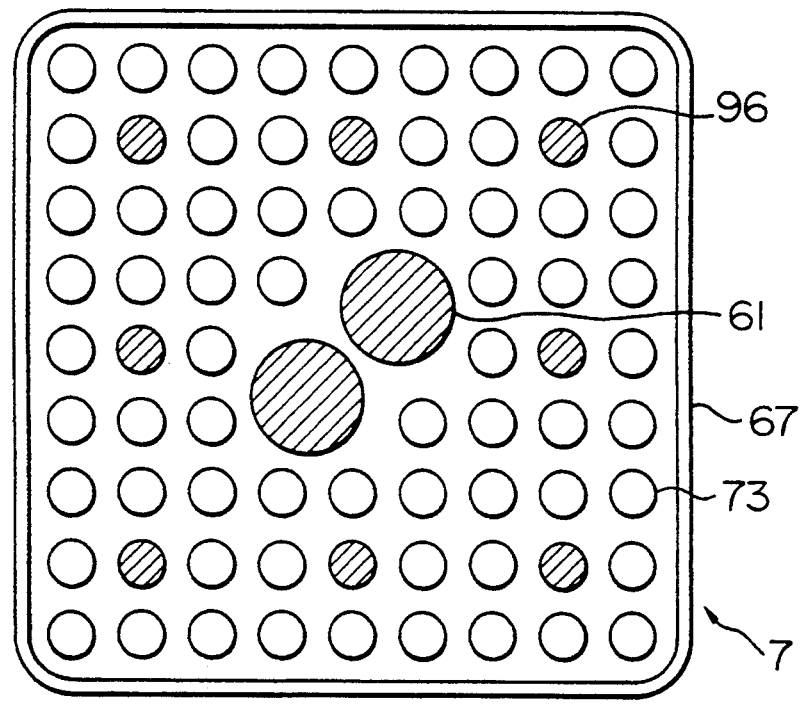
FIG. 10 is a cross-sectional view showing a 9×9 type MOX fuel assembly which is a fourth comparative example of the second embodiment shown in FIG. 4.

Further, as a fourth comparative example, FIG. 10 shows another 9×9 type MOX fuel assembly. In this fuel assembly 7, the number of water rods 96 in the MOX fuel assembly 6 shown in FIG. 8 is increased to eight, and the water rods 96 are provided in four corners of a square defined by four sides each having seven fuel rods in the vicinity of the outer periphery of the fuel rod arrangement and provided on middle points of the four sides of the square. In FIG. 8, the point C indicates a void reactivity coefficient and a maximum linear heat generation ratio of the fuel assembly 7. When it is compared with the fuel assembly 6 indicated by the point G, the void reactivity coefficient is improved and is about −9.5 [%K/K/%void]. However, since the number of the water rods is increased, the maximum linear heat generation ratio is increased and is about 13.4 [kW/ft]. Taking into account the fact that an operational limit value of the maximum linear heat generation ratio in a light water reactor is about 13.4 [kW/ft], this means that there is no margin at all with respect to the operational limit value, and it is not favorable in respect of the design.

Figure 11:
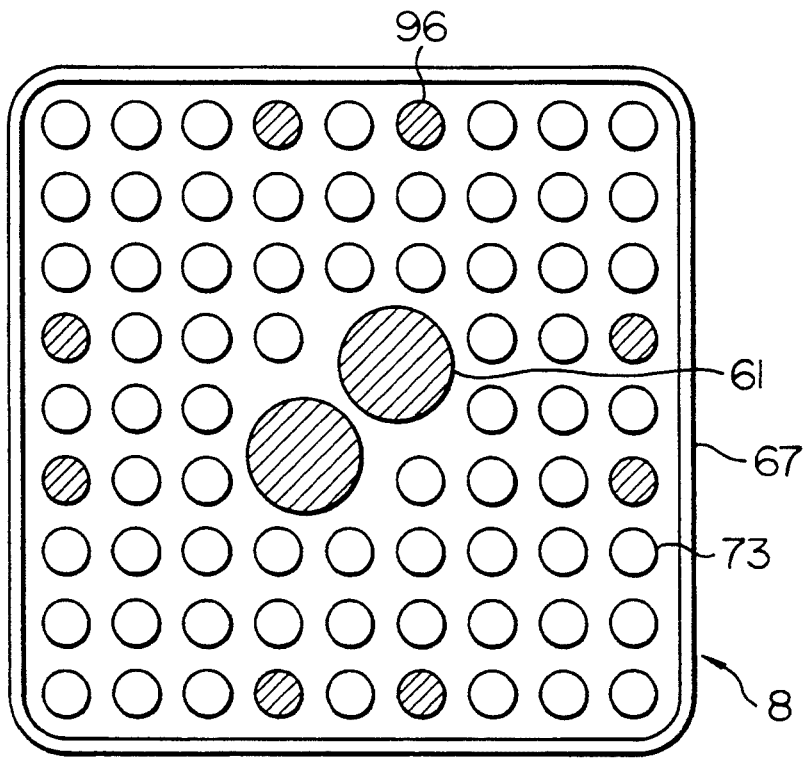
FIG. 11 is a cross-sectional view showing a 9×9 type MOX fuel assembly which is a fifth comparative example of the second embodiment shown in FIG. 4.

Moreover, as a fifth comparative example, FIG. 11 shows another 9×9 type MOX fuel assembly. In this fuel assembly 8, the number of water rods 96 in the MOX fuel assembly 7 shown in FIG. 9 is eight and unchanged, and two of the water rods 96 are provided on each side of a square defined by the outermost periphery of the fuel rod arrangement. In FIG. 8, the point D indicates a void reactivity coefficient and a maximum linear heat generation ratio of this case. The void reactivity coefficient is improved and at substantially the same level as the uranium fuel assembly 4 indicated by the point A. However, since the number of the water rods is eight and unchanged, the maximum linear heat generation ratio is about 13.4 [kW/ft] and equal to that of the MOX fuel assembly 7 indicated by the point C. That is to say, there remains the problem that there is no margin with respect to the operational limit value.

Figure 12:
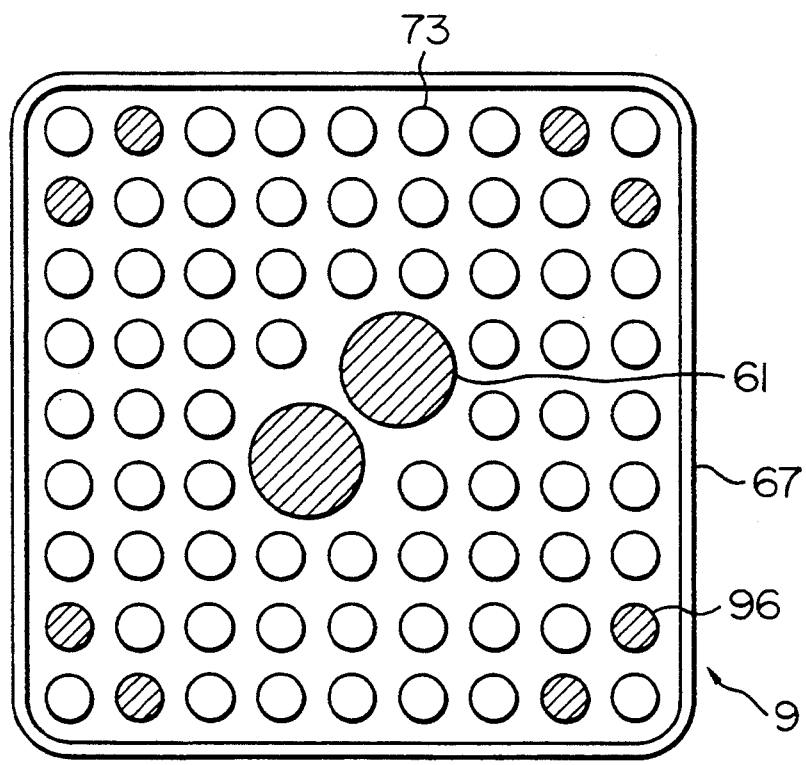
FIG. 12 is a cross-sectional view showing a 9×9 type MOX fuel assembly which is a sixth comparative example of the second embodiment shown in FIG. 4.

Furthermore, as a sixth comparative example, FIG. 12 shows another 9×9 type MOX fuel assembly. In this fuel assembly 9, two of the eight water rods 96 in the MOX fuel assembly 8 shown in FIG. 10 are provided at two positions in the lattice form which are adjacent to each corner of the fuel rod arrangement. In FIG. 8, the point E indicates a void reactivity coefficient and a maximum linear heat generation ratio of this case. Although the maximum linear heat generation ratio is unchanged, the void reactivity coefficient is further improved, and its absolute value is lower than the value of the uranium fuel assembly 4 indicated by the point A. However, since the number of the water rods is eight and unchanged, the maximum linear heat generation ratio is about 13.4 [kW/ft] and equal to that of the MOX fuel assembly 7 indicated by the point C. That is to say, there remains the problem that there is no margin with respect to the operational limit value.

According to the above-described results of comparing the void reactivity coefficients and the maximum linear heat generation ratios of the fuel assemblies 5, 6, 7 respectively shown in FIGS. 7, 9, 10, the void reactivity coefficient can be improved by increasing the number of the water rods, but at the same time, the maximum linear heat generation ratio is increased, so that there will be no margin with respect to the operational limit value. Consequently, by merely increasing the number of the water rods, the maximum linear heat generation ratio reaches the designed limit before the void reactivity coefficient reaches the target value indicated by the point A, thereby failing to achieve the object of the present invention. Also, according to the results of comparing the void reactivity coefficients of the fuel assemblies 7, 8, 9 respectively shown in FIGS. 10, 11, 12, the absolute value of the void reactivity coefficient of the MOX fuel assembly is decreased as the water rods are located closer to the outer periphery of the arrangement of the fuel rods, and it is further decreased as the water rods are located closer to the corner portions of the outer periphery.

Therefore, in the fuel assembly 3 of this embodiment, the number of the water rods 56 is made as small as four so that the maximum linear heat generation ratio will be suppressed to about 12.7 [kW/ft] which is lower than the operational limit value of about 13.4 [kW/ft]. On the other hand, one of the four water rods 56 is provided in each corner portion of the arrangement of the fuel rods so that the void reactivity coefficient will be about $-8.5$ [%K/K/%void]. Although the absolute value is slightly larger than that of the fuel assembly 9 of FIG. 12 indicated by the point E, it can be improved to have a value at substantially the same level as the uranium fuel assembly 4 of FIG. 5 indicated by the point A.

According to this embodiment, the four water rods 56 are respectively located in the four corner portions of the arrangement of the fuel rods in the MOX fuel assembly 3, and consequently, it is possible to obtain the void reactivity coefficient and the maximum linear heat generation ratio which are at substantially the same level as the uranium fuel assembly 4.

Figure 13:
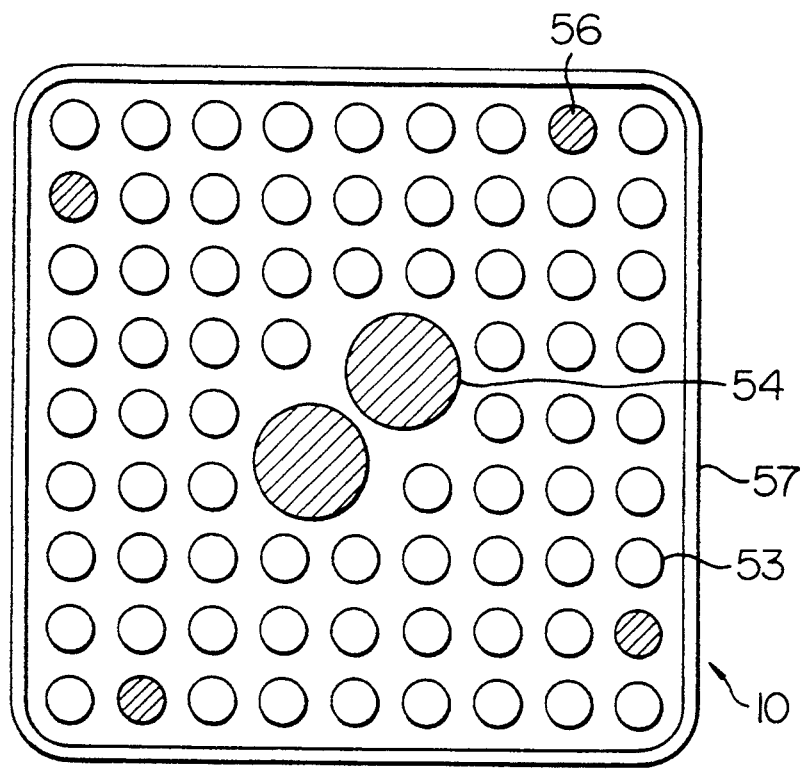
FIG. 13 is a cross-sectional view showing a 9×9 type MOX fuel assembly according to a third embodiment of the invention.

FIG. 13 shows a second embodiment of the present invention. In this fuel assembly 10, the four water rods 56 located in the respective corner portions of the arrangement of the fuel rods in the 9×9 type MOX fuel assembly 3 shown in FIG. 5 are provided in rotation-symmetry such that each water rod is located at one of the two positions in the lattice form which are adjacent to each corner of the fuel rod arrangement. That is to say, the four water rods 56 in the fuel assembly 3 are rotated in the same direction about the center of the arrangement of the fuel rods and moved to positions in the next lines. In FIG. 8, the point H indicates a void reactivity coefficient and a maximum linear heat generation ratio of the fuel assembly 10, which are substantially the same values as the fuel assembly 3 of FIG. 5 according to the first embodiment which are indicated by the point F. That is to say, with the MOX fuel assembly 10 according to the second embodiment, it is possible to obtain the void reactivity coefficient and the maximum linear heat generation ratio which are at substantially the same level as the uranium fuel assembly 4.

Figure 14:
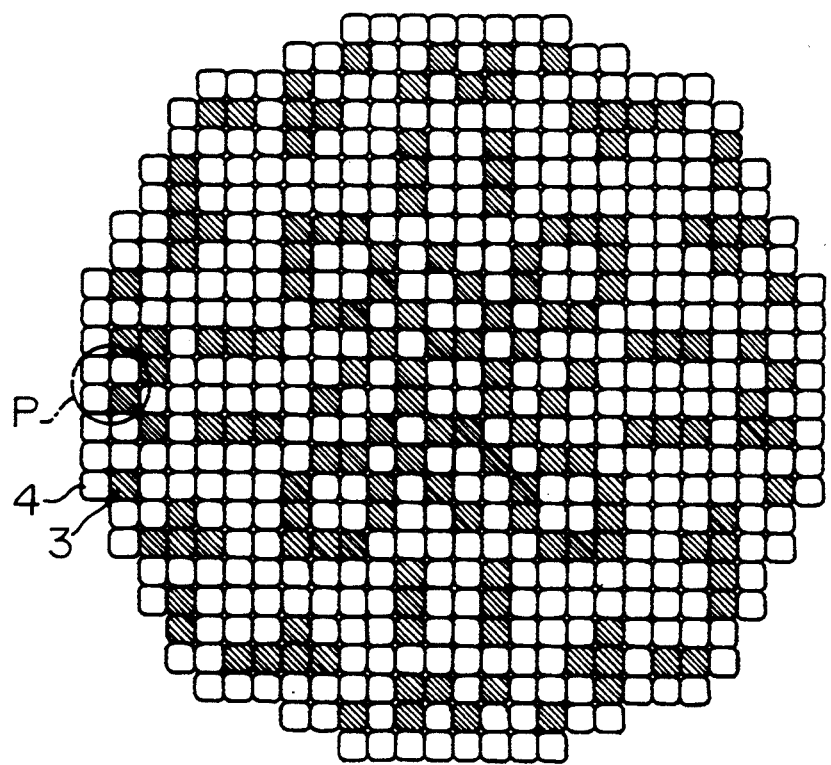
FIG. 14 is a diagram showing one embodiment according to the present invention in relation to a reactor core of a BWR.

FIG. 14 shows one embodiment of a reactor core of a BWR according to the present invention. It is a diagram of the reactor core of the BWR, as viewed from above. This reactor core comprises 548 fuel assemblies each of which is indicated by a blank or shadowed square in the diagram. About 156 of the 548 fuel assemblies are MOX fuel assemblies 3 according to the present invention shown in FIG. 5, and about 392 of them are uranium fuel assemblies 4 shown in FIG. 6.

Figure 15:
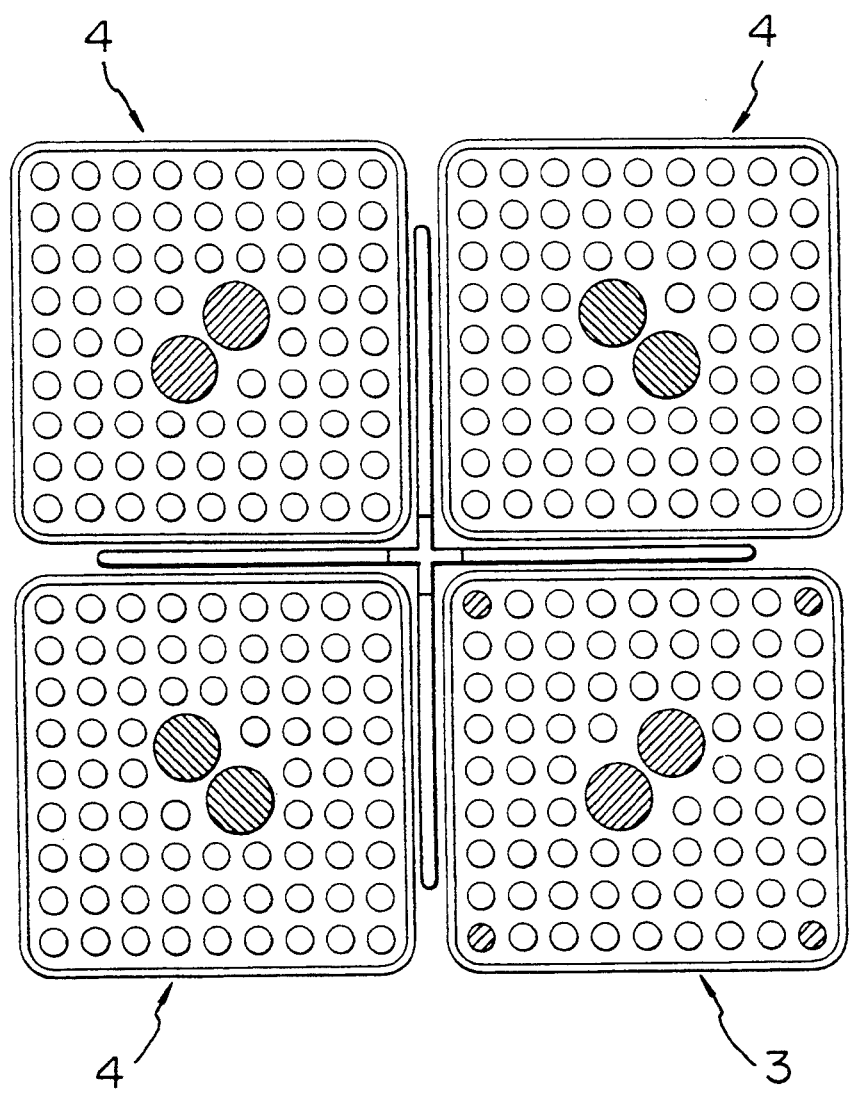
FIG. 15 is an enlarged cross-sectional view showing the portion P of FIG. 14.

FIG. 15 is an enlarged view of a portion P of the reactor core shown in FIG. 14, the portion P including four fuel assemblies indicated by squares blank and shadowed by oblique lines. As shown in FIG. 15, four fuel assemblies located to surround one control rod is a basic unit of the reactor core. In the embodiment shown in FIG. 15, one of the four fuel assemblies is an MOX fuel assembly 3 shown in FIG. 5, and the other three are uranium fuel assemblies 4 shown in FIG. 6.

The MOX fuel-assembly 3 is characterized in that it includes water rods in corner portions of an arrangement of fuel rods, but the uranium fuel assembly 4 is characterized in that it does not include water rods in corner portions of an arrangement of fuel rods.

As described with reference to FIG. 8, the void reactivity coefficient of the MOX fuel assembly 3 indicated by the point F is substantially the same as that of the uranium fuel assembly 4 indicated by the point A. Therefore, as shown in FIG. 15, even if one part of the uranium fuel assemblies which constitute the reactor core are substituted by the MOX fuel assemblies, the void reactivity coefficient of the whole reactor core is substantially the same as that of a reactor core comprising uranium fuel assemblies alone. All the transient behaviors of the reactor core such as a reactivity change when the void coefficient of the reactor core is abruptly changed due to an increase in the pressure or a sudden increase in the power are substantially the same as in the case of a reactor core comprising uranium fuel assemblies alone.

This means that when safety of a reactor core comprising uranium fuel assemblies alone is confirmed, the same safety is surely obtained even if one part of the uranium fuel assemblies are substituted by MOX fuel assemblies, and it is an important factor in respect of safety of the reactor core.

In the embodiment shown in FIG. 15, one of the four fuel assemblies is an MOX fuel assembly. However, since the void reactivity coefficients of the uranium fuel assembly and the MOX fuel assembly are substantially the same, as described above, two of the four fuel assemblies may be MOX fuel assemblies. Further, three or all of them may be MOX fuel assemblies. Even in such a case, the void reactivity coefficient of the whole reactor core will not be affected.

Figure 16:
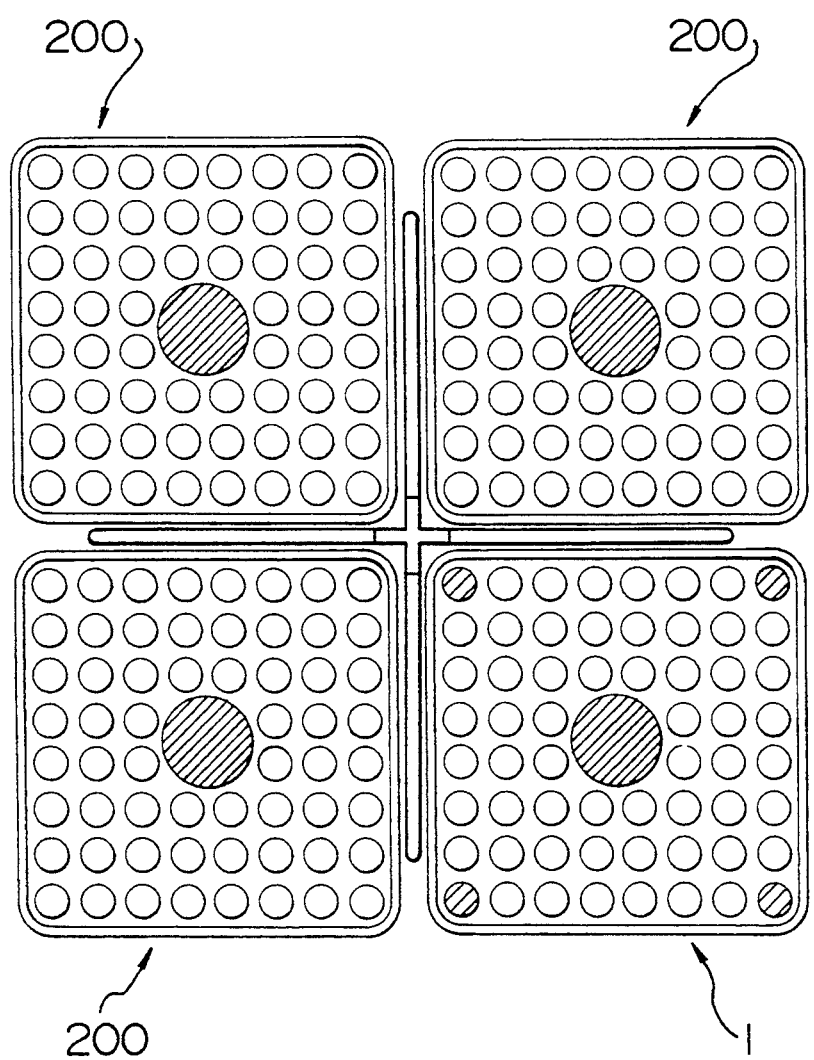
FIG. 16 is an enlarged view showing one portion of a reactor core corresponding to FIG. 15, which reactor core comprises 8×8 type MOX fuel assemblies shown in FIG. 1 and 8×8 type uranium fuel assemblies.

In the above description, the 9×9 type arrangement of fuel rods in the fuel assembly is employed as an example. However, the 8×8 type MOX fuel assembly shown in FIG. 1 and the 8×8 type uranium fuel assembly shown in FIG. 22 have substantially the same void reactivity coefficients. Consequently, as shown in FIG. 16, even if one part of the fuel assemblies are constituted of 8×8 type MOX fuel assemblies, it is possible to obtain the same safety as a reactor core comprising uranium fuel assemblies alone, similarly to the embodiment shown in FIG. 15.

In this manner, according to this embodiment, there can be provided a core of a light water reactor utilizing MOX fuel assemblies by which the void reactivity coefficient and the maximum linear heat generation ratio can be made substantially the same as uranium fuel assemblies.

Although the embodiment of the present invention in relation to a boiling water reactor (BWR) has been described above, one embodiment of this invention in relation to a pressurized water reactor (PWR) will now be described with reference to FIGS. 17 to 20. In this embodiment, the invention is applied to a 17×17 type MOX fuel assembly.

Figure 17:
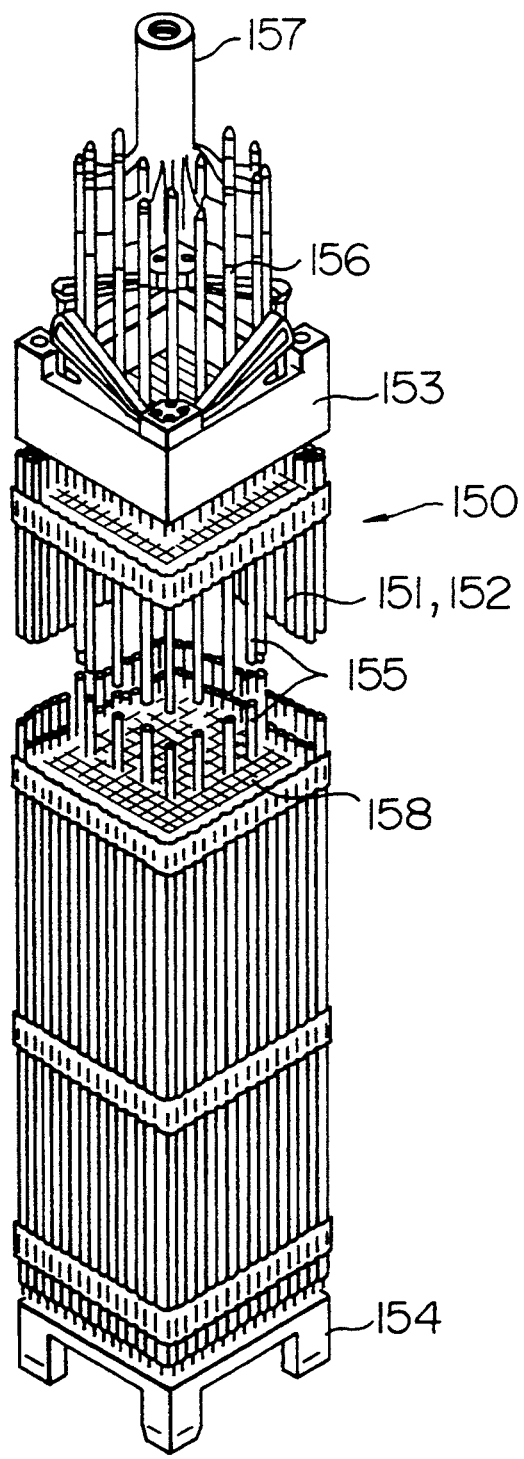
FIG. 17 is a diagram showing an entire structure of a 17×17 type MOX fuel assembly for a PWR according to a fourth embodiment of the invention.

As shown in FIG. 17, a fuel assembly 150 of this embodiment comprises fuel rods 151 and 152 which are regularly arranged in 17 lines and 17 rows and supported by an upper nozzle 153, a lower nozzle 154 and a grid 158. In the grid 158, several control-rod guide tubes 155 in which control rods 156 supported by a control rod cluster 157 can be inserted are provided. These control-rod guide tubes 155 are designed in such a manner that coolant flows therein when the control rods 156 are not inserted, similarly to the above-described water rods.

Figure 18:
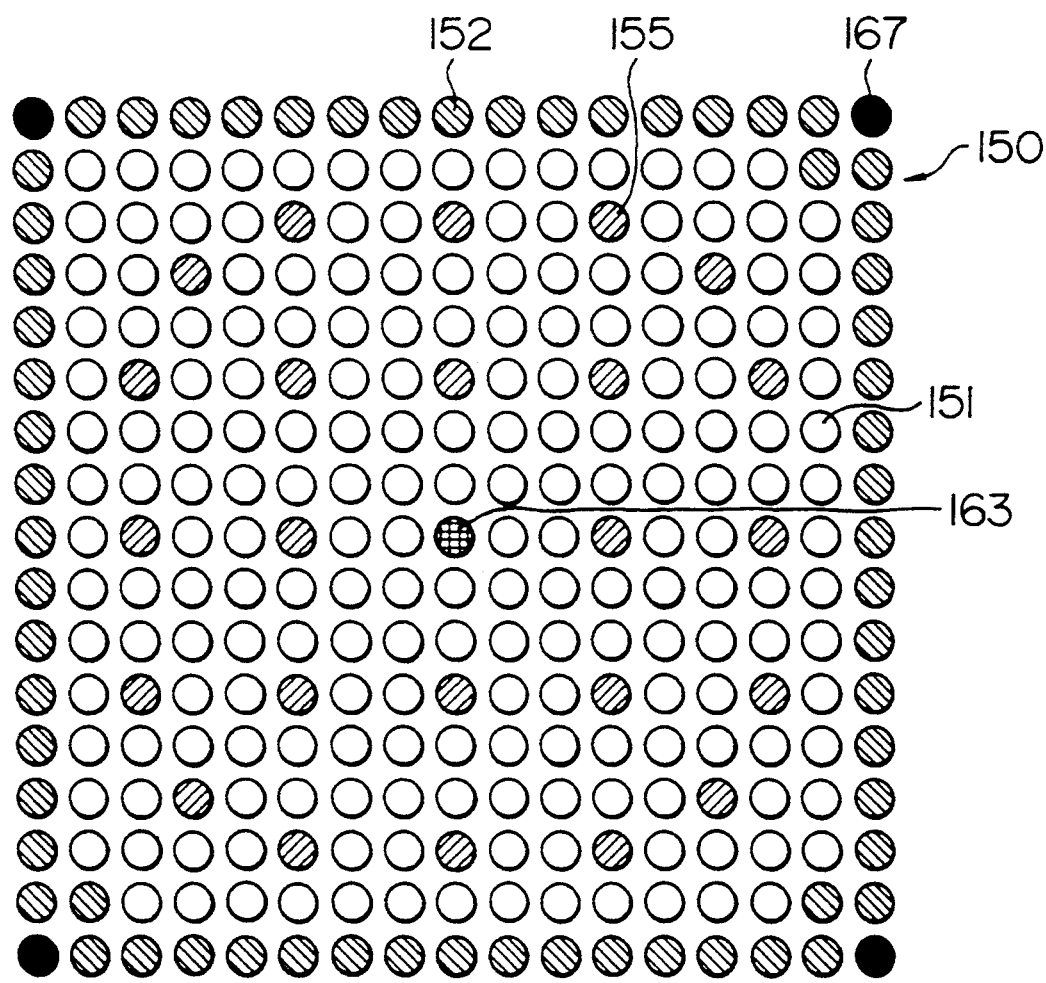
FIG. 18 is a cross-sectional view showing the 17×17 type MOX fuel assembly for the PWR according to the fourth embodiment shown in FIG. 17.

FIG. 18 is a cross-sectional view of the fuel assembly 150. In this fuel assembly 150, a neutron instrumentation tube 163 is provided in the center of the 17×17 type arrangement of fuel rods, the control-rod guide tubes 155 and MOX fuel rods 151 enriched at high level are provided around the center, and MOX fuel rods 152 enriched at intermediate level are provided in the outer peripheral portion of the fuel rod arrangement. Also, a water rod 167 is provided in each of corner portions of the fuel rod arrangement.

Figure 19:
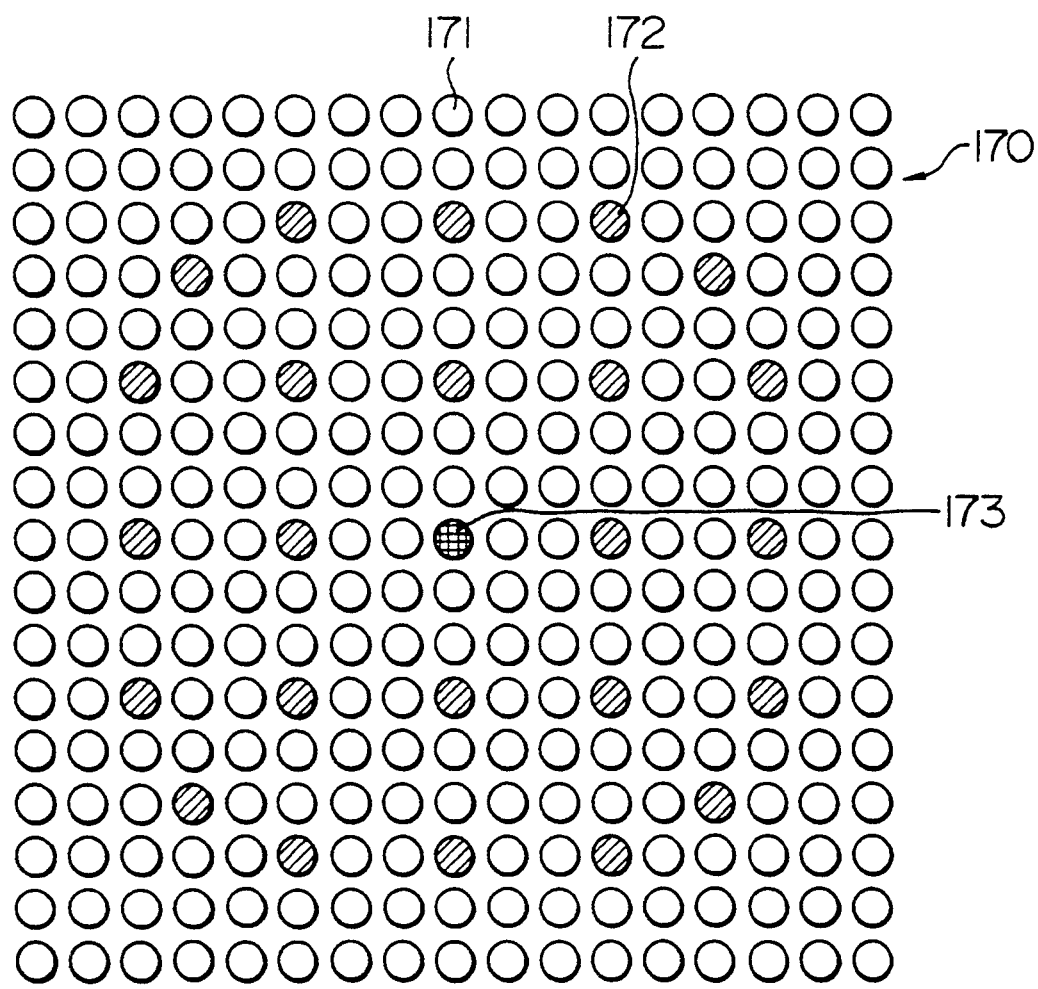
FIG. 19 is a cross-sectional view showing a conventional 17×17 type uranium fuel assembly which is a first comparative example of the fourth embodiment shown in FIG. 17.

As a first comparative example of the present embodiment, FIG. 19 shows a 17×17 type uranium fuel assembly for a PWR according to the conventional technique.

In this uranium fuel assembly 170, a neutron instrumentation tube 173 is provided in the center of the 17×17 arrangement of uranium fuel rods 171, and control-rod guide tubes 172 are provided around the center. The fuel assembly 170 is different from the MOX fuel assembly 150 shown in FIG. 18 in an arrangement of uranium fuel rods and a provision of the uranium fuel rods 171 in corner portions of the arrangement instead of the water rods.

Figure 20:
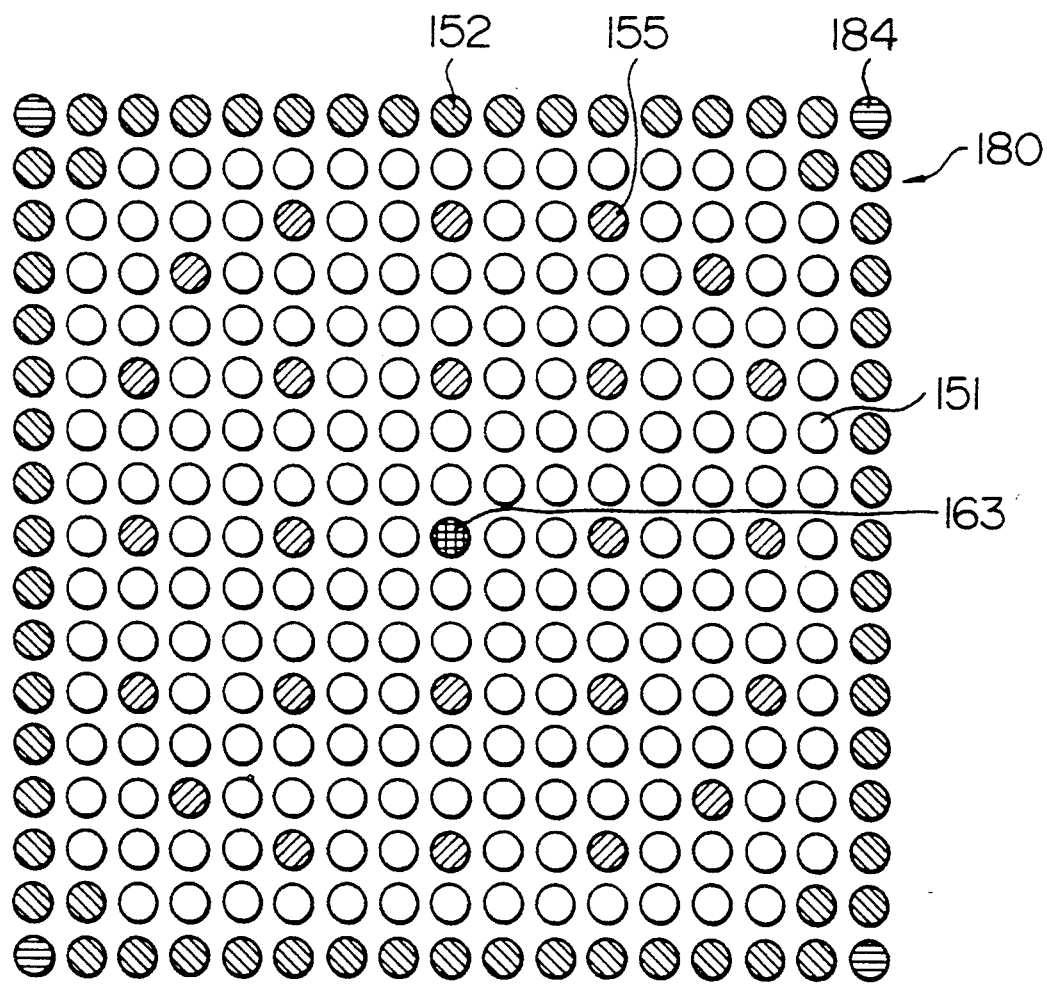
FIG. 20 is a cross-sectional view showing a conventional 17×17 type MOX fuel assembly which is a second comparative example of the fourth embodiment shown in FIG. 17.
Figure 21:
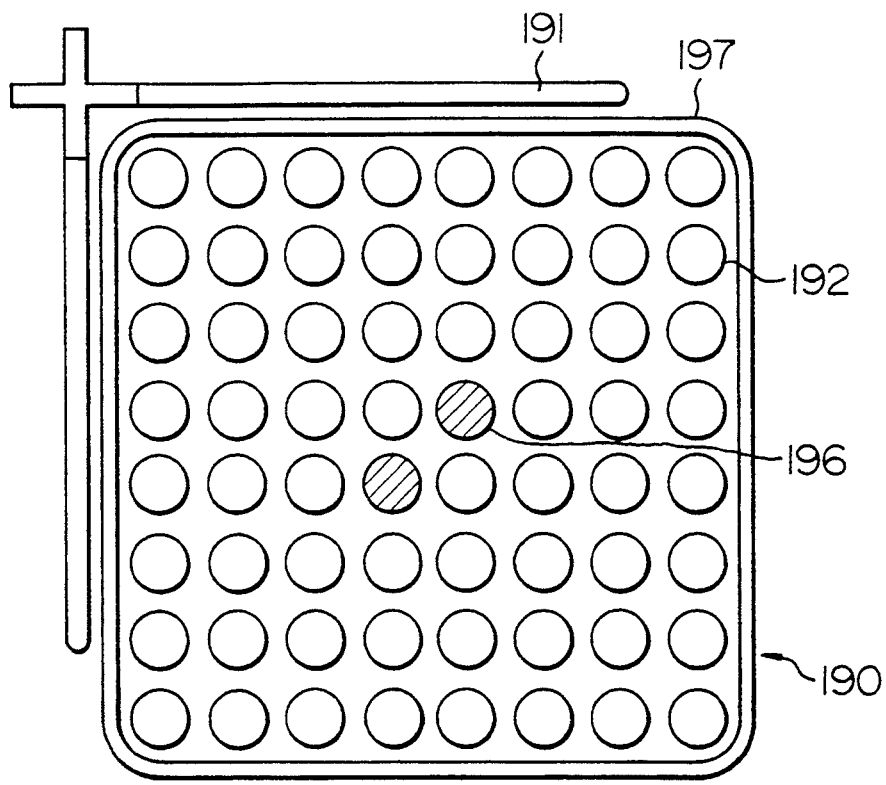
FIG. 21 is a cross-sectional view showing a conventional 8×8 type uranium fuel assembly.

As a second comparative example of the present embodiment, FIG. 20 shows a 17×17 type MOX fuel assembly for a PWR.

In this MOX fuel assembly 180, a neutron instrumentation tube 163 is provided in the center of the 17×17 arrangement of MOX fuel rods 151 enriched at high level, control-rod guide tubes 155 are provided around the center, MOX fuel rods 152 enriched at intermediate level are provided in the outer peripheral portion of the fuel rod arrangement, and MOX fuel rods 184 enriched at low level are provided in the respective corner portions of the fuel rod arrangement. The fuel assembly 180 is characterized in that it comprises three kinds of fuel rods which are enriched at different levels. The fuel assembly 180 is different from the MOX fuel assembly 150 shown in FIG. 18 in a provision of the low-level enriched MOX fuel rods 184 in the corner portions of the arrangement instead of the water rods.

Since the reactor core of the above-mentioned PWR is not boiling during normal operation, the void reactivity coefficient in the case of the BWR is not a problem. However, there is a moderator temperature coefficient serving as an index for indicating a reactivity change with respect to a water density change. When MOX fuel is used, this moderator temperature coefficient has a property to decrease to have a negative value, as compared with the uranium fuel. In order to improve this property, it is effective to enhance neutron moderation effect by increasing the water to fuel volume ratio, similarly to the void reactivity coefficient in the case of the BWR. Therefore, even in the PWR fuel assembly, the moderator temperature coefficient can be improved by providing water rods in which a moderator (coolant) flows. However, similarly to the case of the BWR, in order to prevent an increase in the maximum linear heat generation ratio, it is important to make an increase in the number of water rods as small as possible for the following reason: In general, when an MOX fuel assembly is located adjacent to a uranium fuel assembly in a reactor core, power of fuel rods in the periphery of the MOX fuel assembly tends to increase owing to a neutron spectrum difference between uranium and MOX fuel assemblies, which results in one cause to increase the maximum linear heat generation ratio. This tendency is remarkable in the case of fuel rods in corner portions of the arrangement of fuel rods in particular. In consequence, in the above-described arrangement of water rods to improve the moderator temperature coefficient, locating the water rods in the respective corners of the fuel rod arrangement is especially effective to suppress the maximum linear heat generation ratio.

Therefore, according to the present embodiment, the four water rods 167 are provided in the respective corner portions of the arrangement of fuel rods so as to improve the moderator temperature coefficient, while suppressing the maximum linear heat generation ratio. Further, two kinds of MOX fuel rods, i.e., high-level enriched fuel rods and intermediate-level enriched fuel rods, are enough, and low-level enriched MOX fuel rods are unnecessary. Consequently, the number of processing steps in the manufacture of MOX fuel is reduced.

According to the present invention, there can be provided fuel assemblies for a light water reactor and a core of the light water reactor utilizing these fuel assemblies in which the void reactivity coefficient or the moderator temperature coefficient can be made substantially equal to-that of the uranium fuel assemblies without decreasing the plutonium load largely and without increasing the linear heat generation ratio largely even if the MOX fuel assemblies are used in place of the uranium fuel assemblies. Moreover, in the PWR, the number of kinds of enriched MOX fuel rods can be lessened, so that the number of processing steps in the manufacture of MOX fuel can be reduced.

Incidentally, instead of the water rods, the solid moderator rods including carbon or the like as a solid moderator may be applied to the fuel assembly according to the invention so as to achieve the same meritorious results as the water rods.

What is claimed is:

1. A fuel assembly for a light water reactor comprising a plurality of fuel rods which contain a primary fissile material, wherein at least one of water rods, in which cooling water flows therein when said fuel assembly is provided in the reactor, is provided at least in one of each corner position of an outermost layer of a polygonal arrangement of the fuel rods and a position in the outermost layer adjacent to said corner position in such a manner that said water rods are located in rotation symmetry, each of said water rods being filled with water over a length at least corresponding to a fuel effective length, and the fuel rods are provided at positions in an adjacent layer to the outermost layer which are adjacent to those positions at which said water rods are located.

2. A fuel assembly for a light water reactor according to claim 1, wherein said fissile material includes primarily plutonium when exposure is zero.

3. A fuel assembly for a light water reactor according to claim 2, wherein one of said water rods is located in one of each corner position of the arrangement of the fuel rods and the position in the outermost layer adjacent to said corner position in rotation symmetry.

4. A fuel assembly for a light water reactor according to claim 2, wherein two of said water rods are provided in each corner position of the arrangement of fuel rods and in a position in the outermost layer adjacent to said corner position in such a manner that said water rods are located in rotation symmetry.

5. A fuel assembly for a light water reactor according to claim 2, wherein two of said water rods are provided in both positions in the outermost layer adjacent to each corner position of the arrangement of the fuel rods in such a manner that said water rods are located in rotation symmetry.

6. A fuel assembly for a light water reactor according to claim 2, wherein said polygonal arrangement has substantially a square shape.

7. A fuel assembly for a light water reactor according to claim 1, wherein some of said plurality of the fuel rods contain primary plutonium as a fissile material when exposure is zero, and the others of the fuel rods only contain uranium as a fissile material when exposure is zero.

8. A fuel assembly for a light water reactor according to claim 7, wherein said polygonal arrangement has substantially a square shape.

9. A fuel assembly for a light water reactor according to claim 7, wherein one of said water rods is located in one of each corner position of the arrangement of the fuel rods and the position in the outermost layer adjacent to said corner position in rotation symmetry.

10. A fuel assembly for a light water reactor according to claim 7, wherein two of said water rods are provided in each corner position of the arrangement of fuel rods and in a position in the outermost layer adjacent to said corner position in such a manner that said water rods are located in rotation symmetry.

11. A fuel assembly for a light water reactor according to claim 7, wherein two of said water rods are provided in both positions in the outermost layer adjacent to each corner position of the arrangement of the fuel rods in such a manner that said water rods are located in rotation symmetry.

12. A fuel assembly disposed in a light water reactor, said fuel assembly comprising a plurality of fuel rods which contain a primary fissile material, wherein at least one of solid moderator rods is provided in one of each corner position of an outermost layer of a polygonal arrangement of the fuel rods and a position in the outermost layer adjacent to said corner position in such a manner that said solid moderator rods are located in rotation symmetry, each of said solid moderator rods being filled with a solid moderator over a length at least corresponding to a fuel effective length, and the fuel rods are provided at positions in an adjacent layer to the outermost layer which are adjacent to those positions at which said solid moderator rods are located.

13. A fuel assembly according to claim 12, wherein said fissile material includes primarily plutonium when exposure is zero.

14. A fuel assembly according to claim 13, wherein said polygonal arrangement has substantially a square shape.

15. A fuel assembly according to claim 13, wherein one of said solid moderator rods is located in one of each corner position of the arrangement of the fuel rods and the position in the outermost layer adjacent to said corner position in rotation symmetry.

16. A fuel assembly according to claim 13, wherein two of said solid moderator rods are provided in each corner position of the arrangement of fuel rods and in a position in the outermost layer adjacent to said corner position in such a manner that said solid moderator rods are located in rotation symmetry.

17. A fuel assembly according to claim 13, wherein two of said solid moderator rods are provided in both positions in the outermost layer adjacent to each corner position of the arrangement of the fuel rods in such a manner that said solid moderator rods are located in rotation symmetry.

18. A fuel assembly according to claim 12, wherein some of said plurality of the fuel rods contain plutonium as a primary fissile material when exposure is zero, and the others of the fuel rods only contain uranium as a fissile material when exposure is zero.

19. A fuel assembly according to claim 18, wherein said polygonal arrangement has substantially a square shape.

20. A fuel assembly according to claim 18, wherein one of said solid moderator rods is located in one of each corner position of the arrangement of the fuel rods and the position in the outermost layer adjacent to said corner position in rotation symmetry.

21. A fuel assembly according to claim 18, wherein two of said solid moderator rods are provided in each corner position of the arrangement of the fuel rods and in a position in the outermost layer adjacent to said corner position in such a manner that said solid moderator rods are located in rotation symmetry.

22. A fuel assembly according to claim 18, wherein two of said solid moderator rods are provided in both positions in the outermost layer adjacent to each corner position of the arrangement of the fuel rods in such a manner that said solid moderator rods are located in rotation symmetry.

23. A core of a light water reactor comprising first fuel assemblies each including a plurality of fuel rods which only contain uranium as a fissile material when exposure is zero, second fuel assemblies each including a plurality of fuel rods which contain plutonium as a primary fissile material when exposure is zero, in which in said second fuel assembly at least one of moderator rods is provided at least in one of each corner position of an outermost layer of a polygonal arrangement of the fuel rods and a position in the outermost layer adjacent to said corner position in such a manner that said moderator rods are located in rotation symmetry, each of said moderator rods being filled with a filling substance over a length at least corresponding to a fuel effective length, and the fuel rods are provided at positions in an adjacent layer to the outermost layer which are adjacent to those positions at which said moderator rods are located.

24. A core of a light water reactor according to claim 23, wherein said second fuel assemblies are each arranged such that one of said moderator rods is located in one of each corner position of the arrangement of the fuel rods and the position in the outermost layer adjacent to said corner position in rotation symmetry.

25. A core of a light water reactor according to claim 23, wherein said second fuel assemblies are each arranged such that two of said moderator rods are provided in each corner position of the arrangement of fuel rods and in a position in the outermost layer adjacent to said corner position in such a manner that said moderator rods are located in rotation symmetry.

26. A core of a light water reactor according to claim 23, wherein said second fuel assemblies are each arranged such that two of said moderator rods are provided in both positions in the outermost layer adjacent to each corner position of the arrangement of fuel rods in such a manner that said moderator rods are located in rotation symmetry.

27. A core of a light water reactor according to claim 23, wherein said second fuel assemblies have substantially the same shape and dimensions as said first fuel assemblies.

28. A core of a light water reactor according to claim 23, wherein said polygonal arrangement has substantially a square shape.

* * * * *